United States Patent
Kioka et al.

[11] Patent Number: 5,266,636
[45] Date of Patent: Nov. 30, 1993

[54] PROCESS FOR PRODUCING POLYPROPYLENE AND STRETCHED POLYPROPYLENE FILM

[75] Inventors: Mamoru Kioka, Iwakuni; Masaya Yamada; Masanobu Ishiyama, both of Ichihara; Masao Nakano, Yamaguchi; Akinori Toyota, Iwakuni, all of Japan

[73] Assignee: Mitsui Petrochemical Industries, Ltd., Tokyo, Japan

[21] Appl. No.: 928,015

[22] Filed: Aug. 11, 1992

Related U.S. Application Data

[62] Division of Ser. No. 284,186, Dec. 14, 1988, Pat. No. 5,159,021.

[30] Foreign Application Priority Data

Dec. 15, 1987 [JP] Japan ................................ 62-315204
Dec. 15, 1987 [JP] Japan ................................ 62-315205

[51] Int. Cl.$^5$ .................... C08L 23/10; C08L 23/20; C08F 297/08; C08J 5/18
[52] U.S. Cl. ........................................ 525/95; 525/88; 525/247; 525/270; 525/320; 525/321; 526/348.1
[58] Field of Search ................ 525/88, 321, 247, 270, 525/95

[56] References Cited

U.S. PATENT DOCUMENTS

| | | | |
|---|---|---|---|
| 4,210,729 | 7/1980 | Hermans et al. | 525/247 |
| 4,547,552 | 10/1985 | Toyota et al. | 525/247 |
| 4,551,501 | 11/1985 | Shiga et al. | 525/88 |
| 4,603,174 | 7/1986 | Okada et al. | 525/240 |

FOREIGN PATENT DOCUMENTS

| | | |
|---|---|---|
| 0151883 | 12/1984 | European Pat. Off. |
| 0152701 | 12/1984 | European Pat. Off. |
| 0226004 | 10/1986 | European Pat. Off. |
| 1165954 | 3/1972 | France |
| 61-151204 | 7/1986 | Japan |
| 62-275111 | 11/1987 | Japan |
| 1030797 | 5/1966 | United Kingdom |
| 1104665 | 2/1968 | United Kingdom |

*Primary Examiner*—Carman J. Seccuro, Jr.
*Attorney, Agent, or Firm*—Sherman and Shalloway

[57] ABSTRACT

A process for producing polypropylene, which comprises preliminarily polymerizing 3-methylbutene-1 in the presence of a catalyst system formed from

[A] a solid titanium catalyst component containing magnesium, titanium, halogen and polycarboxylic acid esters as essential components,

[B] an organoaluminum compound, and

[C] an organosilicon compound represented by the general formula $R_nSi(OR')_{4-n}$ wherein R and R' represent a hydrocarbon group, and $0<n<4$, the amount of the 3-methylbutene-1 preliminarily polymerized being 0.1 to 100 g per gram of the solid titanium catalyst, and thereafter, polymerizing propylene or copolymerizing propylene and an alpha-olefin in the presence of the catalyst used in the preliminary polymerization to such an extent that the amount of the monomer or monomers polymerized is from 1,000 to 100,000 times the amount of the 3-methylbutene-1 preliminarily polymerized. Also provided is a stretched polypropylene film having excellent see-through property with little losses of transparency or rigidity obtained by stretching polypropylene containing 1 to 1,000 weight ppm of 3-methylbutene-1 polymer in at least one direction.

5 Claims, No Drawings

PROCESS FOR PRODUCING POLYPROPYLENE AND STRETCHED POLYPROPYLENE FILM

This is a division of application Ser. No. 07/284,186 filed Dec. 14, 1988 U.S. Pat. No. 5,159,021.

BACKGROUND OF THE INVENTION

1. Field of the Invention

This invention relates to a process for producing polypropylene having excellent see-through property which comprises preliminarily polymerizing 3-methylbutene-1 using a specific catalyst system, and then polymerizing propylene or copolymerizing propylene and an alpha-olefin in the presence of the catalyst used in the preliminary polymerization. The invention also pertains to a stretched polypropylene film having excellent see-through property with very little losses of transparency and rigidity which is obtained by stretching polypropylene containing a specified amount of 3-methylbutene-1 polymer in at least one direction.

2. Description of the Prior Art

Many propylene polymers and propylene/alpha-olefin copolymers having a high stereospecificity index, and many processes for their production are known.

It is also known that the propylene polymers and propylene/alpha-olefin copolymers can be produced with a high catalytic efficiency.

Attempts have been made to improve the see-through property or transparency of propylene polymers and propylene/alpha-olefin copolymers.

For example, Japanese Laid-Open Patent Publication No. 80329/1983 discloses a specific method of dispersing sodium benzoate as a nucleating agent in polypropylene in order to improve its transparency. Japanese Patent Publication No. 12460/1980 discloses a method in which 1.3,2.4-di(methylbenzylidine)sorbitol is incorporated in crystalline polypropylene to increase its transparency.

Japanese Laid-Open Patent Publication No. 32430/1970 (corresponding to British Patent 1,104,665) discloses a process for producing a solid polymer moulding composition comprising a copolymer of propylene, said composition comprising at least 55% by weight propylene monomer units, monomer units of a second component, which is a linear 1-olefin having from 4 to 18 carbon atoms, in an amount of up to 35% by weight and having dispersed throughout the composition polymer units of a third component, which is an alpha-olefin whereof the homopolymer has a crystalline melting point above 180° C., present in an amount of up to 10% by weight, which comprises bringing propylene, the second component and the third component into contact with a stereospecific catalyst composed of a compound of a transition metal of Groups IV to VI activated by an organometallic compound or a metal hydride. This patent document states that the resulting composition has improved transparency over polypropylene resin, and 3-methyl-1-pentene, 4,4-dimethyl-1-pentene, vinylcyclohexane and 3-methyl-1-butene are especially suitable as the third component.

U.S. Pat. No. 4,551,501 discloses a crystalline propylene polymer composition having excellent transparency and rigidity comprising a blend of a crystalline polypropylene with a polymer of a vinylcycloalkane having at least 6 carbon atoms, which composition contains 0.05 weight ppm to 10,000 weight ppm of the vinylcycloalkane unit. In Comparative Examples 4 to 6 of this patent, a small amount of 3-methyl-1-butene is homopolymerized in the presence of a titanium trichloride catalyst and diethylaluminum and then a large amount of propylene is homopolymerized to form a propylene copolymer containing 0.3 to 2 g, per gram of the titanium trichloride catalyst, of poly(3-methyl-1-butene), and then the copolymer is mixed with a propylene homopolymer to prepare a composition containing 2 to 200 weight ppm of poly(3-methyl-1-butene). It is seen from Table 3 of this patent that the resulting composition is superior in total light transmittance, but inferior in haze value, light scattering index (LSI) and gloss, to the composition prepared in Example 7 of the patent by a similar method and containing 7 ppm of poly(vinylcyclohexane).

SUMMARY OF THE INVENTION

It is an object of this invention to produce polypropylene having excellent see-through property, particularly film-forming polypropylene having excellent see-through property economically and efficiently.

It is another object of this invention to provide an improved stretched polypropylene having excellent see-through property.

The first object is achieved in accordance with this invention by a process for producing polypropylene, which comprises preliminarily polymerizing 3-methylbutene-1 in the presence of a catalyst system formed from

[A] a solid titanium catalyst component containing magnesium, titanium, halogen and polycarboxylic acid esters as essential components,

[B] an organoaluminum compound, and

[C] an organosilicon compound represented by the general formula $R_nSi(OR')_{4-n}$ herein R and R' represent a hydrocarbon group, and $0<n<4$, the amount of the 3-methylbutene-1 preliminarily polymerized being 0.1 to 100 g per gram of the solid titanium catalyst, and thereafter, polymerizing propylene or copolymerizing propylene and an alpha-olefin in the presence of the catalyst used in the preliminary polymerization to such an extent that the amount of the monomer or monomers polymerized is from 1,000 to 100,000 times the amount of the 3-methylbutene-1 preliminarily polymerized.

In view of the prior art, it is surprising that film-forming polypropylene having excellent see-through property can be produced by the above process.

The second object of this invention is achieved by a stretched polypropylene film obtained by stretching polypropylene containing 1 to 1000 weight ppm of 3-methylbutene-1 polymer in at least one direction.

DETAILED DESCRIPTION OF THE PREFERRED EMBODIMENTS

The present invention will be described below in detail.

This invention includes a process for producing polypropylene, which comprises preliminarily polymerizing 3-methylbutene-1 in the presence of a catalyst system formed from

[A] a solid titanium catalyst component containing magnesium, titanium, halogen and polycarboxylic acid esters as essential components,

[B] an organoaluminum compound, and

[C] an organosilicon compound represented by the general formula $R_nSi(OR')_{4-n}$ wherein R and R' represent a hydrocarbon group, and $0<n<4$, the amount of the 3-methylbutene-1 preliminarily polymerized being 0.1 to 100 g per gram of the solid titanium catalyst, and thereafter, polymerizing propylene or copolymerizing propylene and an alpha-olefin in the presence of the catalyst used in the preliminary polymerization to such an extent that the amount of the monomer or monomers polymerized is from 1,000 to 100,000 times the amount of the 3-methylbutene-1 preliminarily polymerized.

The titanium catalyst component [A] of the catalyst system used in this invention contains magnesium, titanium, halogen and a polycarboxylic acid ester as essential components.

The titanium catalyst component [A] contains magnesium halide having a smaller crystallite size than commercial magnesium halide. Usually, it has a specific surface area of at least about 3 m$^2$/g, preferably about 30 to about 1000 m$^2$/g, more preferably about 100 to 800 m$^2$/g, and its composition does not substantially change when washed with hexane at room temperature. When a diluent, for example an inorganic or organic compound such as a silicon compound, an aluminum compound or a polyolefin, is used, the titanium catalyst component shows high performance even if its specific surface area is lower than the above-specified range. Preferably, in the titanium catalyst component [A], the halogen/titanium atomic ratio is from about 5 to about 200, especially from about 5 to about 100; the electron donor/titanium mole ratio is from about 0.1 to about 10, especially from about 0.2 to about 6; and the magnesium/titanium atomic ratio is from about 1 to about 100, especially from about 2 to about 50. The catalyst component [A] may further contain other electron donors, metals, elements, functional groups, etc.

The titanium catalyst component [A] may be obtained, for example, by contacting a magnesium compound (or magnesium metal), the electron donor and a titanium compound with each other, and other reagents such as compounds of silicon, phosphorus and aluminum may be used as desired.

The titanium catalyst component [A] can be produced, for example, substantially by the methods described in Japanese Laid-Open Patent Publications Nos. 108385/75, 126590/75, 20297/76, 28189/76, 64586/76, 92885/76, 136625/76, 87489/77, 100596/77, 147688/77, 104593/77, 2580/78, 40093/78, 40094/78, 135102/80, 135103/81, 811/81, 11908/81, 18606/81, 83006/83, 138705/83, 138706/83p 138707/83, 138708/83, 138709/83, 138710/73, 138715/83, 23404/85, 21109/86, 37802/86, 37803/86 and 152710/80. Some examples of the methods of producing the titanium catalyst component [A] will be described briefly.

(1) A solid magnesium compound or a solid complex of a magnesium compound and an electron donor is reacted with a titanium compound which is liquid under the reaction conditions. Prior to the reaction, the magnesium compound or the complex compound may be pulverized in the presence or absence of an electron donor and a pulverization aid, and may also be preliminarily reacted with an electron donor and/or a reaction aid such as an organoaluminum compound or a halogen-containing silicon compound. In the above process, the electron donor is used at least once.

(2) A liquid-form titanium of a magnesium compound having no reducing ability is reacted with a liquid titanium compound in the presence of an electron donor to precipitate a solid titanium complex.

(3) The product of (2) is reacted with a titanium compound.

(4) The product of (1) or (2) is reacted with an electron donor and a titanium compound.

(5) A solid magnesium compound or a solid complex of a magnesium compound and an electron donor is reacted with a halogen or a halogen compound or an aromatic hydrocarbon. Prior to the reaction, the magnesium compound or the complex compound may be pulverized in the presence or absence of an electron donor and a pulverization aid and in the presence of a titanium compound, and may also be preliminarily reacted with an electron donor and/or a reaction aid such as an organoaluminum compound or a halogen-containing silicon compound. In the above process, the electron donor is used at least once.

(6) The product of (1), (2), (3) or (4) is treated with a halogen, a halogen compound, or an aromatic hydrocarbon.

(7) A reaction product obtained by contacting a metal oxide, dihydrocarbyl magnesium and a halogen-containing alcohol is contacted with a polycarboxylic acid ester and a titanium compound.

(8) A magnesium compound, such as a magnesium salt of an organic acid, an alkoxymagnesium or aryloxymagnesium is reacted with a polycarboxylic acid ester, a titanium compound and/or a halogen-containing hydrocarbon.

Preferred among these methods are those which involve the use of the liquid titanium halide, and those which involve the use of the halogenated hydrocarbon after or during the use of the titanium compound.

The electron donor that can be a constituent of the titanium catalyst component [A] used in this invention is a polycarboxylic acid ester. Preferred polycarboxylic acid esters are compounds having skeletons represented by the following formulae

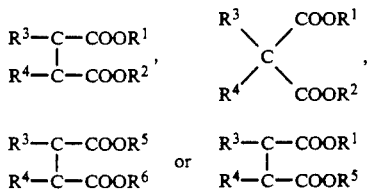

wherein R$^1$ represents a substituted or unsubstituted hydrocarbon group, R$^2$, R$^5$ and R$^6$ represent a hydrogen atom or a substituted or unsubstituted hydrocarbon group, R$^3$ and R$^4$ represent a hydrogen atom or a substituted or unsubstituted hydrocarbon group, preferably at least one of R$^3$ and R$^4$ is a substituted or unsubstituted hydrocarbon group, and R$^3$ and R$^4$ may be linked to each other. The substituted hydrocarbon group in the above definition may be a group having a group containing a hetero atom such as N, O or S, for example C-O-C, COOR, COOH, OH, SO$_3$H, —C—N—C— or NH$_2$.

Especially preferred are diesters of dicarboxylic acids in which at least one of R$^1$ and R$^2$ is an alkyl group having at least two carbon atoms.

Examples of preferred polycarboxylic acid esters having the above skeletons include aliphatic polycarboxylic acid esters such as diethyl succinate, dibutyl succinate, diethyl methylsuccinate, diisobutyl alpha-methylglutarate, dibutylmethyl malonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monooctyl maleate, diisooctyl maleate, diisobutyl maleate, diisobutyl butylmaleate, diethyl butylmaleate, diisopropyl betamethylglutarate, diallyl ethylsuccinate, di-2-ethylhexyl fumarate, diethyl itaconate, diisobutyl itaconate, diisooctyl citraconic acid and dimethyl citraconic acid; aliphatic polycarboxylic acid esters such as diethyl 1,2-cyclohexanecarboxylate, diisobutyl 1,2-cyclohexanecarboxylate, diethyl tetrahydrophthalate and diethyl methylbicyclo[2.2.1heptene-2,3-dicarboxylate; aromatic polycarboxylic acid esters such as monoethyl phthalate, dimethyl phthalate, methylethyl phthalate, monoisobutyl phthalate, diethyl phthalate, ethylisobutyl phthalate, mono-n-butyl phthalate, ethyl-n-butyl phthalate, di-n-propyl phthalate, diisopropyl phthalate, di-n-butyl phthalate, diisobutyl phthalate, di-n-heptyl phthalate, di-2-ethylhexyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and esters of heterocyclic polycarboxylic acids such as 3,4-furanedicarboxylic acid.

Other examples of the polycarboxylic acid ester that can be included in the titanium catalyst component are long-chain dicarboxylic acid esters such as diethyl adipate, diisobutyl adipate, diisopropyl sebacate, di-n-butyl sebacate, n-octyl sebacate and di-n-ethylhexyl sebacate.

Preferred among these polycarboxylic acid esters are those having the skeletons of the above general formulae. More preferred are esters of phthalic acid, maleic acid or substituted malonic acid with alcohols having at least 2 carbon atoms. Diesters of phthalic acid with alcohols having at least 2 carbon atoms are especially preferred. In depositing the electron donor, it is not always necessary to use it as a starting material. It is possible to use a compound convertible to such an electron donor compound in the course of preparing the titanium catalyst compound and to convert it during the preparation.

Another electron donor may be present in the titanium catalyst component. But its amount should be small because too much of it might exert an adverse effect.

The magnesium compound used in the preparation of the titanium catalyst component [A] is a magnesium compound having reducing ability or having no reducing ability.

Examples of magnesium compound having reducing ability include magnesium compounds having a magnesiumcarbon bond or a magnesium-hydrogen bond such as dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butyl magnesium hydride. These magnesium compounds may be used, for example, in the form of complexes with organoaluminum and may be liquid or solid. Examples of magnesium compounds having no reducing ability include magnesium halides such as magnesium chloride, magnesium bromide, magnesium iodide and magnesium fluoride, alkoxymagnesium halides such as methoxymagnesium chloride, ethoxymagnesium chloride, isopropoxymagnesium chloride, butoxymagnesium chloride and octoxymagnesium chloride, aryloxymagnesium halides such as phenoxymagnesium chloride and methylphenoxymagnesium chloride, alkoxymagnesiums such as ethoxymagnesium, isopropoxymagnesium, butoxymagnesium, n-octoxymagnesium and 2-ethylhexoxymagnesium, aryloxymagnesiums such as phenoxymagnesium and dimethylphenoxymagnesium, and magnesium carboxylates such as magnesium laurate and magnesium stearate. These magnesium compounds having no reducing ability may be compounds derived from the above magnesium compounds having reducing ability, or converted from the above magnesium compounds having reducing ability during catalyst preparation. The magnesium compounds may be complex compounds with other metals or mixtures with other metal compounds, or may be mixtures of two or more of these compounds. The magnesium compounds having no reducing ability are preferred, and halogen-containing magnesium compounds are preferred. Magnesium chloride, alkoxymagnesium chlorides and aryloxymagnesium chlorides are above all preferred.

Various compounds are available as the titanium compound used in the preparation of the solid titanium catalyst component [A]. Usually, tetravalent titanium compounds of the formula $TI(OR)_g X_{4-g}$ in which R is a hydrocarbon group, X is a halogen atom, and $0 \leq g \leq 4$ are preferred. Specific examples include titanium tetrachlorides such as titanium tetrachloride, titanium tetrabromide and titanium tetraiodide, alkoxytitanium trihalides such as methoxytitanium trichloride, ethoxytitanium trichloride, n-butoxytitanium trichloride, ethoxytitanium tribromide and iso-butoxytitanium tribromide, alkoxytitanium dihalides such as methoxytitanium dichloride, ethoxytitanium dichloride, n-butoxytitanium dichloride and ethoxytitanium dibromide, trialkoxytitanium monohalides such as trimethoxytitanium chloride, ethoxytitanium chloride, n-butoxytitanium chloride and ethoxytitanium bromide, and tetraalkoxytitaniums such as tetramethoxytitanium, tetraethoxytitanium and tetra-n-butoxytitanium. Of these, the halogen-containing titanium compounds, particularly titanium tetrahalides are preferred. Titanium tetrachloride is above all preferred. These titanium compounds may be used singly or in combination, and may be used after dilution with hydrocarbons or halogenated hydrocarbons.

The amounts of the titanium compound, the magnesium compounds and the electron donor to be deposited and optional compounds such as an electron donor (e.g., an alcohol, a phenol or a monocarboxylic acid), a silicon compound or an aluminum compound used in the preparation of the titanium catalyst component [A] vary depending upon the method of preparation and cannot be generally determined. For example, 0.01 to 5 moles of the electron donors to be deposited and 0.01 to 500 moles of the electron donor may be used per mole of the magnesium compound.

In the present invention, the polymerization is carried out using a catalyst component composed of the titanium catalyst component [A], the organoaluminum compound [B] and the organosilicon compound [C].

The component [B] may include, for example,
(i) organoaluminum compounds having one or more Al-carbon bonds at least in the molecule, such as organoaluminum compounds of the following general formula $$R_m^1Al(OR^2)_nH_pX_q$$

wherein $R^1$ and $R^2$ represents a hydrocarbon group usually having 1 to 15 carbon atoms, preferably 1 to 4 carbon atoms and may be identical or different, X represents a halogen atom, each of m, n, p and q represents a number of 1 to 3, and the sum of m, n, p and q is 3; and (ii) complex alkylated compounds of aluminum and a metal of Group I represented by the general formula $M^1AlR_1^1$ wherein $M^1$ represents Li, Na or K and $R^1$ is as defined.

Examples of the organoaluminum compounds falling within (i) above are compounds of the general formula $$R_m^1Al(OR^2)_{3-m}$$

wherein $R^1$ and $R^2$ are as defined above, and m is preferably a number of 1.5 to 3, compounds of the general formula $$R_m^1AlX_{3-m}$$

wherein $R^1$ and X are as defined above, and m is preferably a number represented by $0<m<3$, compounds of the following general formula $$R_m^1AlH_{3-m}$$

wherein $R^1$ is as defined above, and m is a number of 2 to 3, and compounds of the formula $$R_m^1Al(OR^2)_nX_q$$

wherein $R^1$, $R^2$ and X are as defined, $0<m\leq 3$, $0\leq n<3$, $0\leq q<3$, and $m+n+q=3$.

Specific examples of the aluminum compounds (i) include trialkylaluminums such as triethylaluminum and tributylaluminum; trialkenylaluminums such as triisoprenylaluminum, dialkylaluminum alkoxides such as diethylaluminum ethoxide and dibutylaluminum butoxide; alkylaluminum sesquialkoxides such as ethylaluminum sesquiethoxide and butylaluminum sesquibutoxide; partially alkoxylated alkylaluminums having an average composition of $R_{2.5}^1Al(OR^2)_{0.5}$; partially halogenated alkylaluminums, for example dialkylaluminum halides such as diethylaluminum chloride, dibutylaluminum chloride and diethylaluminum bromide, alkylaluminum sesquihalides such as ethylaluminum sesquichloride, butylaluminum sesquichloride and ethylaluminum sesquibromide, and alkylaluminum dihalides such as ethylaluminum dichloride, propylaluminum dichloride and butylaluminum dibromide; partially hydrogenated alkylaluminums, for example dialkylaluminum hydrides such as diethylaluminum hydride and dibutylaluminum hydride and alkylaluminum dihydrides such as ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

$LiAl(C_2H_5)_4$ and $LiAl(C_7H_{15})_4$ may be cited as examples of the compounds (ii).

Organoaluminum compounds in which two or more aluminum atoms are bonded through an oxygen atom or a nitrogen atom, similar to the compounds (I), may also be cited as examples of the titanium compound. Specific examples are $(C_2H_5)_2AlOAl(C_2H_5)_2$, $(C_4H_5)_2AlOAl(C_4H_9)_2$, $$(C_2H_5)_2AlNAl(C_2H_5)_2,$$
$$|$$
$$C_2H_5$$

and methylaluminoxane.

Among these, the trialkylaluminums and the alkylaluminums in which two or more aluminum atoms are bonded are preferred.

The organosilicon compound as catalyst component (C) is represented by the following general formula [I]

$$R_nSi(OR')_{4-n} \qquad [I]$$

wherein R and R' represent a hydrocarbon group and $0<n<4$.

Preferred examples of R are alkyl, cycloalkyl, aryl, alkenyl, haloalkyl and aminoalkyl groups, and preferred examples of $R^1$ are alkyl, cycloalkyl, aryl, alkenyl and alkoxyalkyl groups. n R groups and (4-n) R' lo groups may each be identical or different.

Specific examples of the organosilicon compound (C) include
trimethylmethoxysilane,
trimethylethoxysilane,
dimethyldimethoxysilane,
dimethyldiethoxysilane,
diisopropyldimethoxysilane,
t-butylmethyldimethoxysilane,
t-butylmethyldiethoxysilane,
t-amylmethyldiethoxysilane,
diphenyldimethoxysilane,
phenylmethyldimethoxysilane,
diphenyldiethoxysilane,
bis-o-tolyldimetboxysilane,
bis-m-tolyldimethoxysilane,
bis-p-tolyldimethoxysilane,
bis-p-tolyldiethoxysilane,
bis-ethylphenyldimethoxysilane,
dicyclohexyldimethoxysilane,
cyclohexylmethyldimethoxysilane,
cyclohexylmethyldiethoxysilane,
ethyltrimethoxysilane,
ethyltriethoxysilane,
vinyltrimethoxysilane,
methyltrimethoxysilane,
n-propyltriethoxysilane,
decyltrimethoxysilane,
decyltriethoxysilane,
phenyltrimetboxysilane,
gamma-chloropropyltrimethoxysilane,
methyltriethoxysilane,
ethyltriethoxysilane,
vinyltriethoxysilane,
t-butyltriethoxysilane,
n-butyltriethoxysilane,
iso-butyltriethoxysilane,
phenyltrietboxysilane,
gamma-aminopropyltriethoxysilane,
chlorotriethoxysilane,
ethyltriisopropoxysilane,
vinyltributoxysilane,
cyclohexyltrimethoxysilane,
cyclohexyltriethoxysilane,
2-norbornanetrimethoxysilane,
2-norbornanetriethoxysilane,
2-norbornanemethyldimethoxysilane, ethyl silicate,
butyl silicate,
trimethylphenoxysilane,
methyltriallyloxysilane,
vinyltris(beta-methoxyethoxy)silane,
vinyltriacetoxysilane, and
dimethyltetraethoxydisiloxane.

Preferred among them are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

The alpha-olefin which can be used in the copolymerization with propylene may be ethylene or a linear or branched alpha-olefin having 1 to 12 carbon atoms. Preferred examples of the alpha-olefin are ethylene, butene-1, pentene-1, hexene-1, 4-methylpentene-1, octene-1, isooctene-1 and decene-1.

It is necessary to perform the preliminary polymerization of 3-methylbutene-1 prior to the polymerization of propylene or the copolymerization of propylene with the alpha-olefin.

The preliminary polymerization is carried out in the presence of the titanium catalyst component (A), at least a part of the organoaluminum compound (B), and the organosilicon compound (C) in an amount of about 0.1 to about 100 g, preferably 0.5 to about 50, more preferably 0.5 to 20 g, especially preferably 1 to 20 g, per gram of the catalyst component (A). The amount of the organoaluminum compound (B) to be present may be one which is sufficient to polymerize the above amount of 3-methylbutene-1 per gram of the component (A). It is, for example, about 0.1 to about 300 moles, preferably about 0.5 to about 100 moles, especially preferably about 1 to about 50 moles, per gram atom of titanium in the titanium catalyst component (A).

The amount of the organosilicon compound (C) present together is about 0.1 to about 100 moles, preferably about 0.5 to about 20 moles, especially preferably about 1 to about 10 moles, per gram-atom of titanium in the solid titanium catalyst component (A).

Preferably, the preliminary polymerization is carried out in an inert hydrocarbon medium. The preliminary polymerization may be carried out batchwise or continuously. The batchwise method is most efficient because it permits preliminary polymerization at a much higher catalyst concentration than in the reaction system of the main polymerization and this is rather preferred.

The suitable concentration of the titanium catalyst component (A) in the preliminary polymerization is about 0.01 to about 200 millimoles, preferably about 0.05 to about 100 millimoles, calculated as titanium atoms, per liter of the inert hydrocarbon medium. The temperature in the preliminary polymerization is usually about $-20°$ to about $+100°$ C., preferably about $-20°$ to about 80° C., especially preferably 0° to about $+40°$ C. The preliminary polymerization is carried out by feeding a predetermined amount of 3-methylbutene-1 at a time or continuously into a suspension of the catalyst in an inert solvent. A molecular weight controlling agent such as hydrogen may be present in the preliminary polymerization.

Propylene is polymerized or copolymerized using the catalyst used in the preliminary polymerization together with portions of the organoaluminum compound (B) and the organosilicon compound (C) which remain unused in the prepolymerization.

In the process of this invention, the polymerization or copolymerization of propylene is carried out in the vapor phase or the liquid phase for example in slurry. In the slurry polymerization, an inert hydrocarbon may be used as a solvent, or the olefin itself may be used as a solvent. The amount of the titanium catalyst component (A) used is, for example, about 0.001 to about 0.5 millimole, preferably about 0.005 to about 0.5 millimole, calculated as Ti atoms per liter of the volume of the polymerization zone. The amount of the organoaluminum compound (B) is such that the amount of the metal atoms in component (B) is about 1 to about 2,000 moles, preferably about 5 to about 500 moles, per mole of titanium in the component (A) in the polymerization system. The amount of the catalyst component (C), calculated as Si atoms in it, is about 0 to about 100 moles, preferably about 1 to about 50 moles, especially preferably about 3 to about 20 moles, per mole of titanium atoms in the component (A).

The catalyst components (A), (B) and (C) may be contacted with each other at the time of polymerization, or before the polymerization. In contacting them before the polymerization, any two of them may be contacted, or portions of two or three of the components may be contacted with each other. The contacting of these catalyst components before the polymerization may be carried out in an atmosphere of an inert gas, or in an atmosphere of an olefin.

The polymerization temperature is preferably about 20° to about 200° C., more preferably about 50° to about 100° C. The pressure is atmospheric pressure to about 100 kg/cm$^2$, preferably about 2 to about 50 kg/cm$^2$. The polymerization may be carried out batchwise, semicontinuously or continuously. It is also possible to perform the polymerization in two or more stages having different reaction conditions.

The amount of propylene, or propylene and the alpha-olefin, polymerized is 1,000 to 100,000 times, preferably 1,000 to 30,000 times, the amount of 3-methylbutene-1 polymerized in the preliminary polymerization.

The present invention also includes a stretched polypropylene film obtained by stretching polypropylene containing 1 to 1000 weight ppm, preferably 1 to 500 weight ppm, more preferably 10 to 400 weight ppm, especially preferably 30 to 400 weight ppm, in at least one direction.

The polypropylene containing 1 to 1000 weight ppm of 3-methylbutene-1 used to obtain the stretched polypropylene film of the invention may be, for example, polypropylene obtained by the process of the invention described hereinabove.

The polypropylene may also be obtained by first producing polypropylene containing at least 1000 weight ppm of 3-methylbutene-1 polymer by the same process as described above, and kneading polypropylene not containing 3-methylbutene-1 polymer with it.

The amount of the 3-methylbutene-1 polymer contained in the polypropylene is preferably at least 0.1% by weight, more preferably 0.1 to 50% by weight, especially preferably 0.5 to 10% by weight. The kneading temperature may be 140° to 350° C., more preferably 180° to 250° C. Polypropylene that can be used in the above kneading may be a homopolymer of propylene or a copolymer of propylene with ethylene or a linear or branched alpha-olefin having 4 to 12 carbon atoms.

Another polymer, a filler, a stabilizer and other additives may be incorporated as desired in the kneading operation.

The stretched polypropylene film of this invention may be obtained by stretching the polypropylene containing 1 to 1,000 weight ppm, preferably 10 to 300 weight ppm, more preferably 30 to 150 weight ppm, of the 3-methylbutene-1 polymer at least in one direction by a generally known method, such as tenter stretching, roll stretching or tubular stretching.

The present invention can provide polypropylene of a high stereospecificity index with a high catalytic efficiency, and polypropylene having excellent see-through property. Since the polypropylene produced contains only a very slight amount of the catalyst residue, an operation of removing the catalyst residue can be omitted, and in molding the polypropylene, a corrosion tendency of a mold can be greatly inhibited.

The present invention can also provide a stretched polypropylene film having excellent see-through property with reduced losses of transparency and rigidity, which is produced by stretching polypropylene containing a specific amount of 3-methylbutene-1 polymer in at least one direction.

The following examples illustrate the present invention in greater detail.

EXAMPLE 1

Preparation of a Titanium Catalyst Component [A]

Anhydrous magnesium chloride (7.14 g; 75 mmoles), 37.5 ml of decane and 35.1 ml (225 mmoles) of 2-ethylhexyl alcohol were reacted at 130° C. for 2 hours to form a uniform solution. To the solution was added 1.67 g (11.3 remoles) of phthalic anhydride, and the mixture was stirred at 130° C. for 1 hour with stirring to dissolve phthalic anhydride in the uniform solution. The resulting uniform solution was cooled to room temperature, and added dropwise to 200 ml (1.8 moles) of titanium tetrachloride kept at −20° C. over 1 hour. After the addition, the temperature of the mixed solution was elevated to 110° C. over the course of 4 hours. When the temperature reached 110° C., 5.03 ml (18.8 mmoles) of diisobutyl terephthalate was added. The mixture was maintained at this temperature for 2 hours with stirring. After the reaction for 2 hours, the solid portion was collected by hot filtration, and suspended in 275 ml of titanium tetrachloride. The suspension was reacted at 110° C. for 2 hours. After the reaction, the solid portion was collected by hot filtration and washed sufficiently with decane and hexane at 110° C. until no free titanium compound was detected in the washings.

The solid titanium catalyst component [A] synthesized by the above process was stored. Part of it was dried so as to examine its catalyst composition. The resulting solid titanium catalyst component [A] was found to comprise 2.6% by weight of titanium, 58% by weight of chlorine, 18% by weight of magnesium and 12.4% by weight of diisobutyl phthalate.

Preliminary Polymerization

Purified hexane (420 ml) was charged into a 2-liter nitrogen-purged autoclave and cooled to 0° C., and then 50 remoles of triethyl aluminum, 10 g of 3-methylbutene-1, 10 remoles of trimethylmethoxysilane and 5 remoles, as titanium atoms, of the titanium catalyst component [A] were fed into the autoclave. After the autoclave was sealed up, the monomer was polymerized at 20° C. for 3 hours with stirring. After the polymerization, the reaction mixture was taken out under a nitrogen atmosphere. The liquid portion was removed. The solid portion was isolated and slurried in decane. The amount of the monomer preliminarily polymerized was 0.9 g per gram of the catalyst.

Polymerization

One hundred liters of purified hexane was charged into a 250-liter autoclave, and at room temperature under a propylene atmosphere, 94 remoles of triethyl aluminum, 9.4 remoles of cyclohexylmethyldimethoxysilane and 1.9 remoles, as titanium atoms, of the catalyst component [A] subjected to the preliminary polymerization were fed into the autoclave. After introducing 25 Nl of hydrogen, propylene was polymerized at 70° C. for 2 hours. During the polymerization, the pressure was maintained at 7 kg/cm$^2$-G.

After the polymerization, the slurry containing the resulting polymer was filtered and separated into a white powdery polymer and a liquid portion. After drying, the amount of the white powdery polymer was 57.9 kg. The polymer had a boiling n-heptane extraction residue of 98.8%, an MFR of 2.6 dg/min. and an apparent density of 0.46 g/ml.

In view of the fact that part of Ti was separated during the preliminary polymerization, 14900 g, per gram of the catalyst, of propylene was polymerized. Accordingly, the content of poly(3-methylbutene-1) was 60 weight ppm.

Production of a Biaxially Stretched Film

One hundred parts by weight of the resulting polypropylene containing poly(3-methylbutene-1) was mixed with 0.1 part by weight of calcium stearate, 0.1 part by weight of BHT (2,6-di-tertiary butylhydroxytoluene) and 0.1 part by weight of Irganox 1010 (an antioxidant produced by Ciba-Geigy; tetrakistmethylene-3(3′,5′-di-tertiary butylhydroxyphenyl)propionatelmethane) as stabilizers in a Henschel mixer, and then pelletized by extruder having a cylinder diameter of 65 mm at a kneading temperature of 220° C.

The resulting pellets were extruded at 280° C. by a sheet extruder having a cylinder diameter of 90 mm, and formed into a 1.5 mm thick sheet by a cold roll at 30° C. The sheet obtained was stretched longitudinally at 145° C. to 5 times by a tenter-type consecutive biaxially stretching device, and subsequently stretched transversely to 10 times in a tenter kept at 170° C. to give a biaxially stretched film having a thickness of about 20 microns.

Evaluation of the Film

The transparency of a film has been expressed in the past by haze or gloss. Sometimes, these properties do not agree with the results of visual observation owing to optical variations or differences in smoothness among film surfaces. In the present application, the transparency is defined by haze values (the smaller the better) and the see-through property is defined as optical property evaluated by visual observation.

(1) See-Through Property Evaluated by Visual Observation

Five films each having a thickness of 30 microns were stacked, and the light from a fluorescent lamp was viewed through the films. The see-through feeling was evaluated on a scale of 5 grades in which 5 is good and 1 is bad.

(2) Light Scattering Index (LSI)

Measured by an LSI tester made by Toyo Seiki Co., Ltd.

(3) Haze

Measured in accordance with ASTM D1003.

(4) Diameter of the spherulites

The diameter of spherulites in the cross section of the sheet before biaxial stretching was measured by a stereomicroscope ($\times 100$).

As the spherulite size of the sheet is smaller, the biaxially stretched film tends to have better see-through property. Hence, the diameter of the spherulites was used as a measure for obtaining a film having good see-through property.

(5) Young's Modulus

The Young's modulus of the film in the transverse direction was measured by an instron tensile tester at a pulling speed of 50 m/min. in accordance with JIS K6781.

EXAMPLE 2

Preparation of a Titanium Catalyst Component [A]

As in Example 1, a Ti catalyst component [A] was prepared and then subjected to a preliminary polymerization.

Preliminary Polymerization

Purified n-decane (1330 ml) was fed into a 2-liter nitrogen-purged autoclave, and cooled to 0° C. Then, 150 remoles of triethylaluminum, 60 g of 3-methylbutene-1, 150 remoles of trimethylmethoxysilane and 15 remoles, as titanium atoms, of the titanium catalyst component [A] were fed into the autoclave. After the autoclave was sealed air-tight, the monomer was polymerized at 20° C. for 3 hours with stirring. After the polymerization, the reaction mixture was taken out. The liquid portion was removed, and the solid portion was isolated and slurried in decane. The amount of the monomer preliminarily polymerized was 1.8 g per gram of the catalyst.

Polymerize

Purified n-decane (2.8 liters) was added to a 5-liter fully nitrogen-purged glass reactor equipped with a stirrer. The temperature was raised to 60° C., and a gaseous mixture of propylene and hydrogen with a hydrogen content of 0.83% by volume was fed into n-decane while bubbling. While the gaseous mixture was fed, 120 mmoles of triethylaluminum, 12 remoles of cyclohexylmethyldimethoxysilane and 2.37 mM, calculated as titanium atoms, of the titanium catalyst component [A] were added, and propylene was polymerized at 60° C. for 2.5 hours. After the lapse of 2.5 hours from the addition of the catalyst, about 5 ml of isopropanol was added to stop the polymerization, and simultaneously, the feed gas was replaced by nitrogen. The n-decane suspension containing the resulting polymer was filtered, and the solid polymer was fully washed with n-hexane and dried at 80° C. under reduced pressure. The amount of the resulting polymer was 1,003 g. The polymer had a melt index of 8.5 g/10 min. Accordingly, the poly(3-methylbutene-1) content of the polymer was 1.0% by weight.

Production of a Biaxially Stretched Film

The resulting polymer containing poly(3-methylbutene-1) (1.0 part by weight) and 0.1 part by weight of calcium stearate, 0.1 part by weight of BHT and 0.1 part of Irganox 1010 as stabilizers were added to 100 parts by weight of polypropylene having an II (heptane extraction residue) of 97.2% and an MFR of 1.5 g/10 min. The mixture was pelletized and formed into a sheet under the same conditions as in Example 1. The sheet was biaxially stretched under the same conditions as in Example 1 to give a biaxially stretched film having a thickness of about 20 microns.

COMPARATIVE EXAMPLE 1

Preparation of a Titanium Catalyst Component [A]

A titanium catalyst component [A] was prepared in the same way as in Example 1.

Preliminary Polymerization

Purified hexane (420 ml) was fed into a 2-liter nitrogen-purged autoclave and cooled to 0° C. Then, 50 remoles of triethylaluminum, 50 g of 3-methylbutene-1, 10 remoles of trimethylmethoxysilane and 5 mmoles, calculated as titanium atoms, of the titanium catalyst component [A] were fed into the autoclave. The autoclave was sealed air-tight, and the monomer was polymerized at 20° C. for 6 hours with stirring. After the polymerization, the reaction mixture was taken out under a nitrogen atmosphere. The liquid portion was removed, and the solid portion was isolated and slurried in decane. The amount of the monomer preliminarily polymerized was 4.1 g per gram of the catalyst.

Polymerization

Purified hexane (100 liters) was fed into a 250-liter autoclave, and at room temperature under a propylene atmosphere, 300 remoles of triethylaluminum, 30 remoles of cyclohexylmethyldimethoxysilane and 6 mmoles, calculated as titanium atoms, of the catalyst component [A] subjected to the preliminary polymerization. After 25 Nl of hydrogen was introduced, the temperature was raised to 70° C., and propylene was polymerized for 30 minutes. The pressure during the polymerization was maintained at 7 kg/cm$^2$-G.

After the polymerization, the slurry containing the resulting polymer was filtered, and separated into a white powdery polymer and a liquid portion. After drying, the amount of the white powdery polymer formed was 43.4 kg. The polymer had a boiling n-heptane extraction residue of 98.8 %, an MFR of 2.8 dg/min. and an apparent density of 0.43 g/ml.

In view of the fact that part of Ti separated during the preliminary polymerization, 3.540 g of propylene polymerized per gram of the catalyst. Accordingly, the poly(3-methylbutene-1) content of the resulting polymer was 1,200 weight ppm.

Production of a Biaxially Stretched Film

One hundred parts by weight of the resulting polypropylene containing poly(3-methylbutene-1) was mixed with 0.1 part by weight of calcium stearate, 0.1 part by weight of BHT and 0.1 part by weight of Irganox 1010 as stabilizers, and pelletized, formed into a sheet, and biaxially stretched, under the same conditions as in Example 1 to give a biaxially stretched film having a thickness of about 30 microns.

COMPARATIVE EXAMPLE 2

Production of a Biaxially Stretched Film

One hundred parts by weight of polypropylene powder having an II (heptane extraction residue) of 97.2% and an MFR of 1.5 g/10 min. was mixed with 0.1 part of calcium stearate, 0.1 part by weight of BHT and 0.1 parts by weight of Irganox 1010, and the mixture was pelletized, formed into a sheet, and biaxially stretched, to give a biaxially stretched film having a thickness of about 30 microns.

The results obtained in Examples 1 and 2 and Comparative Examples 1 and 2 are shown in Table 1.

TABLE 1

| Example (Ex.) or Comparative Example (CEx.) | Content of poly(3-methyl-butene-1) (weight ppm) | Properties of the biaxially stretched film | | | | Spherulite diameter of the sheet (microns) |
|---|---|---|---|---|---|---|
| | | See-through property evaluated by visual observation | LSI (%) | Haze (%) | Young's modulus (kg/cm$^2$) | |
| Ex. 1 | 60 | 5 | 1.6 | 0.4 | 60,000 | 5 |
| Ex. 2 | 100 | 5 | 1.7 | 0.4 | 60,000 | 5 |
| CEx. 1 | 1200 | 2 | 2.4 | 0.8 | 60,000 | 10 |
| CEx. 2 | 0 | 1 | 3.7 | 0.4 | 60,000 | 30 |

We claim:

1. A stretched polypropylene film obtained by stretching a polypropylene containing 1 to 1,000 weight ppm of 3-methylbutene-1 polymer in at least one direction, the propylene polymer being (1) a kneaded mixture of (i) a propylene polymer polymerized in the presence of, and containing at least 1000 ppm of, 3-methylbutene-1 polymer which was preliminarily polymerized in the presence of a catalyst comprising (A) a solid titanium catalyst component containing magnesium, titanium, halogen and polycarboxylic acid ester as essential components, (B) an organoaluminum compound, and (C) an organosilicon compound represented by the general formula $R_nSi(OR')_{4-n}$ wherein R and R', which may be the same or different, each represent a hydrocarbon group and $0<n<4$, with (ii) a propylene polymer containing no 3-methylbutene-1, or (2) a propylene polymer polymerized in the presence of, and containing 1 to 1000 ppm, of 3-methylbutene-1 polymer which was preliminary polymerized in the presence of the above catalyst comprising (A), (B) and (C).

2. The film of claim 1 in which the 3-methylbutene-1 polymer content of polypropylene is 1 to 500 weight ppm.

3. The film of claim 1 in which the 3-methylbutene-1 polymer content of polypropylene is 10 to 400 weight ppm.

4. The film of claim 1 in which the stretching is carried out by a tenter stretching method, a roll stretching method or a tubular stretching method.

5. The film of claim 4 in which the stretching is carried out biaxially.

* * * * *